United States Patent [19]

Gatineau et al.

[11] 3,987,209
[45] Oct. 19, 1976

[54] METHOD OF PREPARING FLESH-CONTAINING PRODUCTS SUCH AS ROAST MEAT OR FOWL AND PORK-BUTCHER'S PRODUCTS SUCH AS HAMS AND PIES

[75] Inventors: Jacques, André, Gustave Gatineau, Villers-Cotterets; Pierre Hamel, Sedan, both of France

[73] Assignee: Central Properties Company Limited, Vaduz, Liechtenstein

[22] Filed: Oct. 16, 1975

[21] Appl. No.: 622,994

Related U.S. Application Data

[63] Continuation-in-part of Ser. No. 489,521, July 17, 1974, abandoned.

[30] Foreign Application Priority Data

Aug. 9, 1973 France .......................... 73.29205

[52] U.S. Cl. .......................... 426/396; 426/398; 426/404; 426/407; 426/513
[51] Int. Cl.² .......................................... A22C 7/00

[58] Field of Search ........... 426/129, 332, 393, 397, 426/398, 404, 407, 414, 513, 518, 641, 644–646, 396

[56] References Cited

UNITED STATES PATENTS

| | | | |
|---|---|---|---|
| 3,100,713 | 8/1963 | Grant | 426/513 |
| 3,351,265 | 11/1967 | Miller | 426/129 |
| 3,574,642 | 4/1971 | Weinke | 426/129 |
| 3,649,300 | 3/1972 | Olson et al. | 426/332 |

Primary Examiner—A. Louis Monacell
Assistant Examiner—R. B. Penland

[57] ABSTRACT

A process for preparing flesh-containing products such as roast fowl and butcher's meat and pork-butcher's products such as hams, pies, sausages or other products, wherein pieces of raw or previously treated flesh and additive substances corresponding to the desired products are placed and enclosed under vacuum within vessels giving the desired products their final shape, the pieces of flesh, put into the vessels, undergoing a repeated vacuum action for de-aerating same.

8 Claims, 9 Drawing Figures

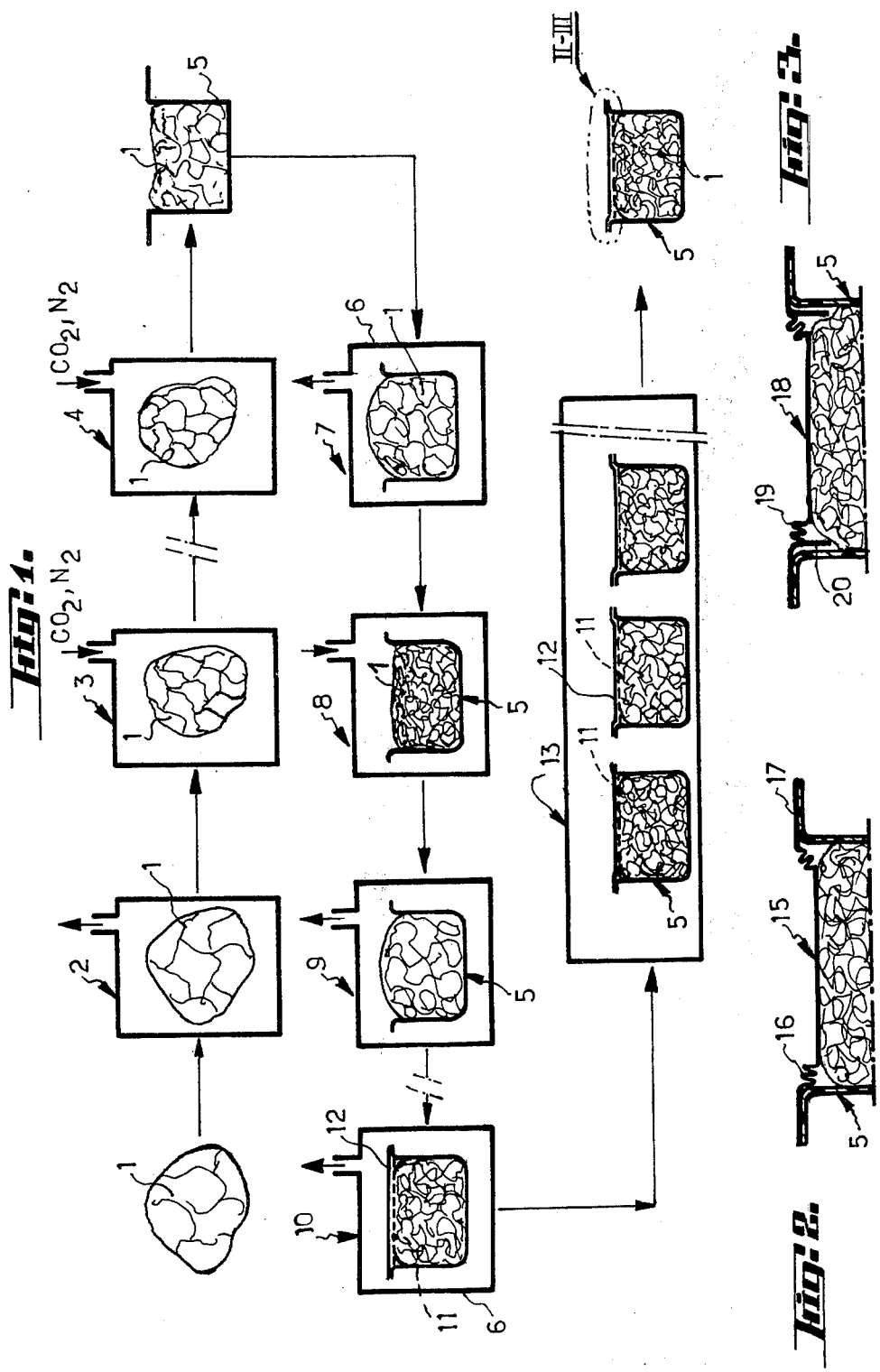

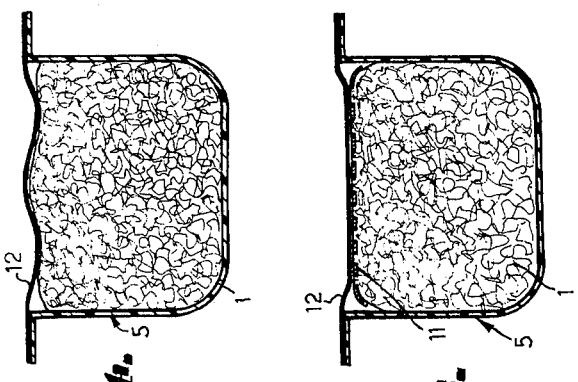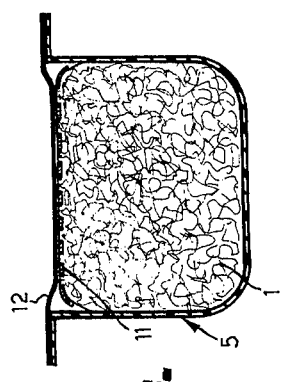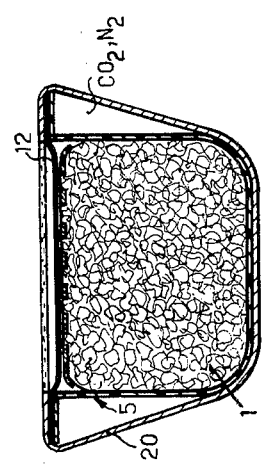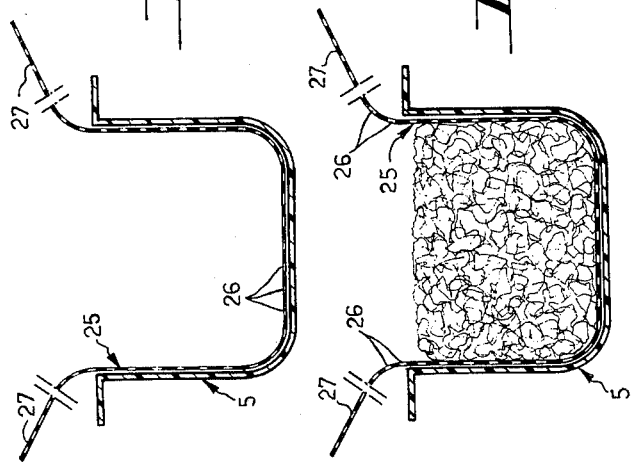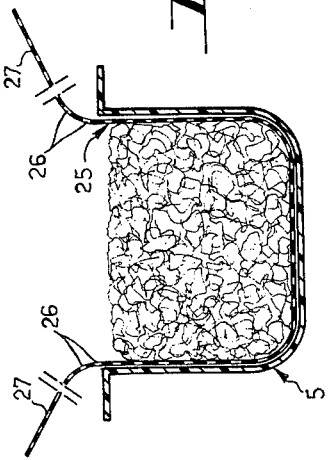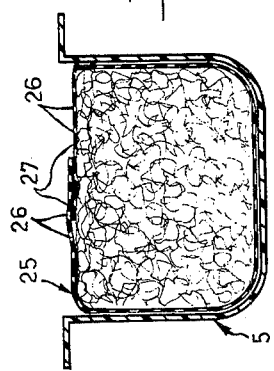

METHOD OF PREPARING FLESH-CONTAINING PRODUCTS SUCH AS ROAST MEAT OR FOWL AND PORK-BUTCHER'S PRODUCTS SUCH AS HAMS AND PIES

This application is a continuation-in-part of our co-pending application Ser. No. 489,521, filed on July 17, 1974, now abandoned, under the same title: "METHOD OF PREPARING FLESH-CONTAINING PRODUCTS SUCH AS ROAST, MEAT OR FOWL AND PORK-BUTCHER'S PRODUCTS SUCH AS HAMS, PIES AND PRODUCTS THUS OBTAINED."

The invention relates essentially to a method of preparing flesh-containing products such as roast fowl or roast butcher's meat and pork-butcher's products such as pies, hams, sausages or the like as well as the products or articles obtained in the state of food products or foodstuffs conditioned within their packings, that is such as obtained by the process as well as in the state of products, goods or produces taken out from the packings and ready for consumption.

It is known indeed that the manufacture of ham presently involves a tedious operating step which calls for much care and labor or workmanship. While very large progresses or advances have been made with respect to pickling or brining (pickling or brining by passing into a bath for a duration of several months or pickling or brining through squirting or churning for a duration of a few hours), the same does not hold true in respect of the art of making or preparing proper wherein the process is carried out as follows:

Pieces of raw flesh which have been caused to soak in an excess of pickling brine (salt, nitrite, polyphosphate, lactoprotein, water and so on) during the squirting and churning step are placed in cast aluminum or stainless steel molds on the bottoms of which has been laid a thin polyethylene sheet. These molds are closed with an untight cover or lid which owing to a set of springs strongly compresses the pieces of flesh within the mold for the whole duration of the cooking and cooling operating steps.

During the cooking or baking which lasts from 4 to 12 hours according to the ham size, the pickling brine, the fat and the constitutional water are caused to be salted out, which is difficult to control and which varies according to the composition of the pickling brine, the temperature and the duration of the cooking or baking step and also according to the treatments or processes the ham could have undergone before, during and after the pickling or brining step. The compression achieved by the cover provided with springs causes the pieces of flesh to be set in a body or as a mass so that upon turning out or stripping a compact ham without any splitting is obtained.

After having been cooled down the ham is stripped or withdrawn from the mold, dressed or trimmed by hand before being reconditioned under a generally retractable film of plastics or like synthetic material.

During this handling the ham which has been Pasteurized upon being cooked is given a strong surface recontamination which is very detrimental to its preservation unless it undergoes again a Pasteurization within the packing.

The known processes for manufacturing ham are therefore difficult to be controlled and it is difficult to standardize the production in particular in respect of the following points:

moisture of the product the fat of which has been taken off; it is very difficult in the present state of the art to perfectly control the salting out during the cooking step;

constancy of the ham weights for the same ground as previously stated;

duration of the preservation in relation to the extent and the nature of the surface re-infection;

amount of pickling brine remaining within the ham which has an influence upon the preservation and the taste or flavour of the product.

In addition the use of cast aluminum or stainless steel molds requires the provision of a complete washing, de-fatting and maintenance plant and does not allow large variations in the shapes, due to the investment represented by the providing of a ham mold-yard.

In particular the washing and maintenance item alone represents a substantial indirectly producing labor or workmanship item.

To avoid these inconveniences there has already been proposed for preparing flesh-containing products such as roasts, butcher's meat or pork-butcher's products to treat or process these products within the final packing which will serve at the same time for their putting up or display.

Such processes offer the advantage of protecting the products against any microbial defilement after the heat treatment they undergo and on the other hand of avoiding the exudations which occur compulsorily during handicraft preparation in molds. The products prepared according to these processes however are generally de-aerated inadequately and the residual oxygen contained within the products exhibits the inconveniences of allowing an oxidizing which results in a change of the colouring and moreover of allowing the development of aerobic microbial germs.

The very object of the invention is therefore to overcome the various inconveniences of the prior art processes owing to a systematic removal of the residual oxygen while allowing for an easy preparation, a perfect taste or flavour retaining, a long time of preservation, an easiness of working up and a perfect standardization of the preparation proper.

For this purpose the invention provides a method for preparation of flesh-containing products such as roast fowl and butcher's meat and of pork-butcher's products like ham, pie, sausage, according to which pieces of flesh which are raw or have been subjected to any previous treatment and additive substances corresponding to the desired products are placed and enclosed under vacuum within vessels or like containers giving the desired products their final shapes and which is characterized by the step consisting in subjecting the pieces of flesh placed within said vessels to the repeated vacuum action in particular for de-aerating them.

It has indeed been found that a de-aeration effected through the vacuum action alone generally while tightly closing in sealed relationship the vessels or containers holding the products was inadequate to effectively remove the oxygen from the residual air, i.e. the oxygen occluded or entrapped within the pieces of flesh as well as that which is contained within the pockets being formed between the pieces of flesh during the filling of the vessels.

According to another characterizing feature of the invention the de-aeration of the pieces of flesh is prepared by subjecting them before placing them within the vessels to a kneading or working or churning step carried out under vacuum.

The systematic removal of oxygen is accordingly effected in two phases or stages of the process according to the invention corresponding to the removal of the occluded or entrapped oxygen and of the oxygen contained within the pockets provided between the pieces of flesh.

According to still further characterizing features of the invention upon the de-aeration of the pieces of flesh a gas possibly under pressure such as nitrogen or carbon dioxide is caused to act upon these pieces of flesh between any two successive vacuum actions.

According to still another characterizing feature of the invention during the kneading or churning step carried out under vacuum the action of the vacuum is discontinuous and alternates with injections of gas such as nitrogen or carbon dioxide with a view to provide a scavenging or sweeping of the residual oxygen.

The purpose of the kneading or churning step is also, as known, to break the muscle-fibres of the meat thereby exerting a very significant influence upon the texture of the finished product, upon the improvement of its tenderness as well as upon its water retention power or capacity. The discontinuous action of the vacuum surprisingly improves the effect of the kneading or churning step upon the muscle-fibres in particular when the gas used between two vacuum actions is carbon dioxide which dissolves itself within the pieces of flesh and is evolving or given off again at every vacuum action thereby resulting in microbreaks of the muscle-fibres. Moreover the carbon dioxide which remains fixed within the flesh through carbonatation improves the preservation of the foodstuffs to a large extent.

The invention will be better understood and further objects, characterizing features, details and advantages thereof will appear more clearly as the following explanatory description proceeds with reference to the accompanying diagrammatic drawings given by way of non limiting examples only illustrating various presently preferred specific forms of embodiment of the invention and wherein:

FIG. 1 diagrammatically shows the various stages or operating steps of the process according to the invention as applied in particular to the preparation of ham;

FIGS. 2 and 3 illustrate alternative embodiments of covers shown in II–III in FIG. 1 and used according to the invention to tightly close the vessels in sealing relationship;

FIGS. 4 and 5 show cross-sectional views on a larger scale of the closed vessels according to the invention;

FIG. 6 is a sectional view showing a closed vessel according to the invention contained within an outer overpacking; and FIGS. 7, 8 and 9 show a modification of the invention according to which a yieldable plastics sheet is disposed within each vessel.

By way of example there has been shown in the drawings and in particular in FIG. 1 an application of the method according to the invention to the preparation of ham.

Ham or the pieces of raw ham are at first subjected to a pickling or brining step. The injection of pickling brine through squirting can be performed in two ways, either through the artery into the whole ham prior to the boning step or by squirting with multiple needles after the boning step. Thus an amount of about 8% of pickling brine in ham weight is injected, this pickling brine generally including for 100 g. of water: 5% of phosphates, 5% of NaCl, 4% of saccharose, 0.2% of $NaNO_2$ (percentages expressed in weight). There may be also added spices, the amount of spices used depending upon the taste or flavour sought and upon the presentation of the spices.

The pieces 1 of raw ham which have been at first subjected to the pickling or brining step are then treated through a kneading or churning step which enables the absorption, uniformly distributed within the mass or body, of a defined amount of pickling brine while causing these pieces of flesh to undergo a physical treatment resulting in the partial ruptures or breakings of the muscle-fibres until they are given a substantially paste-like or pie-like texture.

The churning step as is well known is performed in a tank or vat revolving about an axis differing from the axis of symmetry whereas the kneading is carried out by means of an arm or a dasher rotating within a stationary vessel.

The pieces of ham which have been subjected to the pickling or brining step are according to a preferred embodiment of the invention treated through churning by being placed into a vat which is caused to spin about an axis different from its axis of symmetry for half an hour at a speed of 20 revolutions per minute.

The churned meat is then at a temperature of about 4° to 5° C.

In FIG. 1 the various stages of the kneading or churning operation have been shown diagrammatically at 2, 3 and 4, the kneading or churning step exerting according to the invention a continuous mechanical action during which the pieces of ham are caused to be acted upon by a vacuum action alternating with an injection of a gas possibly under pressure such as nitrogen or carbon dioxide or of a mixture of both of these gases. A vacuum of 92% corresponding to a residual pressure of about 50 mm of mercury column height is at first built up at the start of the churning step (stage 2 in FIG. 1) and then this vacuum is released through an injection of gaseous carbon dioxide at atmospheric pressure (stage 3 in FIG. 1) and then the vacuum of 92% is restored again. This alternation of the vacuum action and the injection of $CO_2$ may be repeated twice the last injection of $CO_2$ being shown at 4 in FIG. 1.

Alternatively it is possible to use nitrogen or a mixture of nitrogen and gaseous carbon dioxide instead of gaseous carbon dioxide. The choice between both of these neutral gases will depend upon the nature of the product processed: the carbon dioxide shows a greater tendency than nitrogen to dissolve itself in the flesh and therefore to break the fibres of the flesh upon vacuum restoration. Nitrogen or a mixture of nitrogen and carbon dioxide is therefore used when it is desired to restrict such an effect or carbon dioxide is on the contrary used for promoting such an effect.

According to another alternative embodiment of the invention the aforesaid churning step may be replaced by a kneading step, i.e. the pieces of ham are placed within a stationary vessel comprising an arm which is rotating slowly at a speed of 5 revolutions per minute. The treatment lasts 12 hours at the rate of 5 minutes per hour. The degree of vacuum used is the same as in the aforesaid churning step, the temperature of the pieces of ham is the same, the vacuum action lasts during the four first minutes of each process cycle or treatment period of 5 minutes and a neutral gas such as nitrogen or carbon dioxide is injected into the vessel for the last minute of each kneading period of 5 minutes.

The pieces of flesh having undergone the churning or the kneading step are then placed within vessels 5 which are rigid or semi-rigid small boat-shaped receptacles or troughs having the final shape of the forthcoming ham. These boat-shaped receptacles or troughs 5 are made from a material capable of sustaining the cooking temperatures and may be made from films of plastics material consisting of one single layer or of laminated layers which may be of differing characters or they may be made from aluminum or like material or also from a laminated complex of aluminum and plastics material so as to exhibit good properties of gas tightness or imperviousness to gases.

For standardizing the production a constant weight of flesh 1 is advantageously introduced into each boat-shaped receptacle 5 of given shape. In a preferred form of embodiment these boat-shaped receptacles may contain 6 kg of ham which correspond to the most advantageous putting up from the commercial standpoint and they are made from polyethylene of high density (0.960 – 0.966) or from polypropylene, with a thickness of 2 mm, these materials being likely to be rendered opaque by means of a white dye-stuff or like colouring matter such as titanium oxide. These materials are those which presently provide the best results but they may however be substituted for by more elaborated or sophisticated products having a higher cost price and exhibiting characteristics at least equal to those of the aforesaid materials.

The small boat-shaped receptacles 5 holding the pieces of raw flesh are then placed within vacuum bells 6 in order to achieve a full de-aeration of the pieces of ham and to remove the oxygen of the air which still remains occluded or entrapped within the pieces of flesh as well as that which is contained within the pockets, gaps or voids left between the pieces of flesh.

The de-aeration is advantageously carried out in several steps or stages 7, 8, 9, 10 during which the vacuum action alternates with an injection possibly under pressure of nitrogen, carbon dioxide or a mixture of both of these gases. During the first stage 7 of the de-aerating operation, vacuum is built up within the bell 6 for about 20 seconds the residual pressure in the bell being of about 50 to 100 mm of mercury column height and the vacuum action upon the pieces of ham 1 results in an expansion of these pieces of flesh inside of the boat-shaped container 5 and the vacuum bell 6. The action of the vacuum produces as a secondary effect the breaking of the muscle-fibres which have not been broken during the foregoing churning or kneading step. This has a very significant consequence upon the texture of the finished product, upon the improvement of its tenderness and upon its water retention power or capability. During this first vacuum action the temperature of the pieces of ham has not been controlled and is of about 10° to 12° C.

In the following stage 8 the vacuum is released by means of an injection into the enclosure 6 of nitrogen, carbon dioxide or a mixture of both of these gases at atmospheric pressure. The injection of neutral gas occurs for a few seconds advantageously in order to also provide a scavenging or sweeping effect by this neutral gas. The injection of gas into the enclosure 6 results in a compression or squeezing of the pieces of flesh 1 inside of the boat-shaped receptacle 5. Then during the stage 9 of the de-aerating operation the action of the vacuum corresponding to a residual pressure of 50 to 100 mm of mercury column height is repeated a second time for about 20 seconds thereby causing a new although smaller expansion of the pieces of flesh within the boat-shaped receptacle 5. The vacuum is then applied again as in the stage 8 through injection and scavenging or sweeping of neutral gas for a few seconds.

This alternation of vacuum and gas injection may be repeated several times.

During the next stage 10 a cover 11 made from rigid or semirigid material with downward turned edges, capable of sustaining the cooking temperatures and which is advantageously bored with a plurality of holes is placed on the pieces of flesh 1 which are subjected a last time to the action of vacuum for an adequate time in order to enable the tight sealing of a cap or lid 12 made from yielding or flexible plastics material which is impervious to gases and sustains the cooking temperatures and which is sealed under vacuum with its edges in fluid-tight relationship upon the edges or the rim of the boat-shaped receptacle 5. The use of a cover 11 bored with a plurality of holes which allow the escape or exit of the last traces of air has the effect of providing for the flatness of the ham surface when sealing the cap or lid 12 during the stage 10 of de-aeration.

The cover 11 may be made from the same material as the boat-shaped receptacle 5. The flexible cap or lid 12 may be made from a complex substance comprising a polyester film having a thickness of 12 micromillimeters, metallized or plated with a layer of aluminum with a thickness of 2 micromillimeters and adhesively bonded, stuck or glued on a backing polyethylene film of high density having a thickness of 80 to 100 micromillimeters which is welding or sealing itself onto the edges or the rim of the boat-shaped receptacle 5. When this boat-shaped receptacle is made from polypropylene, polypropylene should of course be used to form the counter-bonded layer supporting or backing said thin polyester film.

Alternatively there may also be used for making the cap or lid 12 a film of polyamide-6 having a thickness of 50 micromillimeters associated with a polyethylene or polyprothylene film.

In some particular instances during the de-aeration stages 7, 8, 9, 10 the vacuum may be released inside of the enclosure 6 merely by restoring the atmospheric pressure inside of this enclosure.

As the action of vacuum during the stages of de-aerating the pieces of flesh contained within the boat-shaped receptacles 5 results in a more or less anarchical swelling of those pieces of flesh there is a risk of defiling the edges of the boat-shaped receptacle on which the lid or cap 12 providing the tightness of the final packing will be sealed or welded.

This inconvenience is avoided according to the invention owing to the cover 11 bored with fine apertures which may be placed onto the surfaces of the pieces of flesh before the first stage 7 of de-aeration and which is then interposed between the flesh and the cap or lid 12 after having provided for the cleanliness of those portions of the boat-shaped receptacle on which the cap or lid 12 will be sealed or welded subsequently.

There has been shown in particular in FIGS. 4 and 5 the differences in flatness of the upper or top face of the product enclosed within the boat-shaped receptacles 5 according as a cover 11 bored with fine apertures and interposed between the product and the cap or lid 12 is used or not.

It should also be noted that the sealing or welding step for the cap or lid takes place under a residual pressure of about 200 mm of mercury column height and such a step lasts for about 40 seconds.

After these de-aeration steps the boat-shaped receptacles 5 tightly closed by the cap or lid 12 are subjected at 13 to a heat cooking treatment which lasts for about 8 hours at about 70° C. The boat-shaped receptacles are afterwards allowed to cool down and are stored before being packed into cardboard boxes for shipping purposes.

FIGS. 2 and 3 show alternative embodiments of the part II–III of a boat-shaped receptacle 5 in FIG. 1 and more specifically alternative embodiments of the caps or lids which are adapted to tightly close the boat-shaped receptacles 5. In order to provide a good flatness of the top surface of the product contained within the boat-shaped receptacle 5 and to avoid the use of covers 11, the lids or caps 15 may as shown in FIG. 2 be made from semi-rigid or rigid plastics material impervious to gases and comprise adjacent to their peripheries a pleated or like folded formation 16 which enables them to be slightly deformed under the action of the outer atmospheric pressure so that the flat central portion of the cap or lid 15 is caused to closely bear in flat relationship upon the surface of the product after tight sealing of the peripheral edges 17 of the cap or lid onto the corresponding edges of the boat-shaped receptacle 5.

In FIG. 3 the cap or lid 18 comprises in addition to a pleated or like folded formation 19 adjacent to its periphery a peripheral flange 20 adapted to extend slightly into the boat-shaped receptacle 5 for protecting from defilement the edges thereof onto which the sealing of the cap or lid 18 is carried out.

In order to take care of the putting up for sale and also to increase the time of preservation of the product processed according to the invention the boat-shaped receptacles 5 tightly closed by lids or caps 12, 15 or 18 are placed after heat cooking treatment within outer flexible or stiff overpackings 20 which are closed in gas-tight relationship and in which is introduced a neutral gas or a mixture of neutral gases such a nitrogen and carbon dioxide. This outer overpacking improves the gas-tightness of the whole assembly and may be made from a complex film of polyamide-6-polyethylene or polypropylene having a thickness of about 150 micromillimeters.

According to an alternative embodiment of the invention shown in FIGS. 7, 8 and 9, a thin flexible sheet made for instance from plastics material is disposed within each vessel 5 before filling same with pieces of flesh. This sheet 25 which is perforated with many small holes 26 conforms substantially to the inner contour of the vessel 5 and its edges 27 extend or project largely beyond the edges of the vessel 5. The pieces of flesh are then placed into the vessel 5 unto the sheet 25 (FIG. 8) and then the edges 27 of the sheet 25 are folded down onto the top surface of the product which is thus wrapped into said sheet 25 (FIG. 9). Then a cover 11 may or not be used as in the previous embodiments. At the end of the de-aerating step a lid 12, 15 or 18 as the case may be tightly closes each vessel in sealing relationship as previously described.

This sheet facilitates the stripping or withdrawal and may be a low-density polyethylene film with a thickness of about 50 micromillimeters.

The advantages of the method according to the invention which consists in carrying out the cooking of the pieces of flesh within a packing intended to be put up or displayed for sale after having caused them to undergo a full de-aeration to remove the residual oxygen are very numerous.

From the standpoint of working the advantage of dispensing with the conventional stainless steel or cast aluminum molds for making ham is outstanding: in addition to the investment represented by the provision of a mold-yard the method according to the invention removes all the inconveniences resulting from their use, namely: conveyance and handling, maintenance, washing, storage and so on. From the standpoint of product quality the advantages are not less significant: the cooking under vacuum within a tightly closed packing after full de-aeration of the product enables all the organoleptic intrinsic qualities inherent with ham and pickling brines to be fully retained and makes the inclusion of additive substances such as spices or aromatics fully effective. Moreover the bacteriological qualities of the products prepared according to the invention are incomparable owing to the bacteriological cleanliness of the product and to the absence of oxygen which could cause changes in the colouring of the products as well as the development of aerobic microbial germs. The time of preservation of the finished product is therefore much longer than that obtained with prior art processes.

It will also be appreciated that the cover 11 interposed between the top surface of the product and the cap or lid 12 will facilitate the use of the product by the consumer and may in particular serve as a dish for purposes of putting up or displaying this product, the turning out, stripping or withdrawing from the mold being accomplished when the boat-shaped container 5 is turned upside down.

The use of a sheet 25 for wrapping the product as shown in FIGS. 7, 8, 9 offers other following advantages:

The edges of the vessel 5 remain clean and thus enable to perform an easy and reliable sealing or welding of the lid 12, 15 or 18.

During the de-aerating step the air escapes readily through the small holes 26 formed in the sheet 25.

During the cooking of the product a small amount of gelatine is exuding through the holes 26 into the space left between the sheet 25 and the vessel 5 thereby enabling an easy withdrawal of the product from the mold for consumption purposes and also improving the appearance of the product.

It should therefore be understood that the invention is not at all limited to the forms of embodiment disclosed and shown which have been given by way of illustrative example only. In particular it is possible to use other materials than plastics materials as for instance metal sheets made from aluminum, aluminum complex or compound and so on. The invention accordingly comprises all the means constituting technical equivalents of the means described as well as their combinations if same are carried out according to its gist and used within the scope of the appended claims.

What is claimed is:

1. A method of preparing flesh containing products from raw pieces of flesh, comprising, subjecting the raw pieces of flesh to a continuous mechanical treatment under alternating vacuum action and inert gas injection for breaking the muscle-fibres of the flesh, placing the pieces of flesh within vessels giving the desired products their final shape, subjecting the said pieces of flesh placed within the vessels to a series of expansion and compression treatments by alternating vacuum action and inert gas injection for a time sufficient to complete the breaking of the muscle-fibres and for fully de-aerating the pieces of flesh, and sealing under vacuum the said vessels and cooking said pieces of flesh within said vessels.

2. A method according to claim 1, wherein said inert gas is carbon dioxide under a pressure at least equal to the atmospheric pressure.

3. A method according to claim 1, further comprising the step of placing a cover made from semi-rigid material onto said pieces of flesh disposed inside of said vessels before sealing the latter under vacuum.

4. A method according to claim 3, wherein said cover has a plurality of bored holes.

5. A method according to claim 1 further comprising the steps of placing a cover provided with a plurality of holes onto said pieces of flesh disposed inside each of said vessels before the steps of expansion and compression.

6. A method according to claim 1, comprising the step of placing a semi-rigid cover onto said pieces of flesh within each of said vessels, said cover being deformable at its periphery by means of a pleated formation, and then sealing said cover under vacuum onto said vessel for closing same tightly whereby said cover is closely applied onto the conditioned product after the atmospheric pressure has been restored.

7. A method according to claim 1, consisting, prior to filling said vessels, in placing into each of the vessels a thin flexible sheet made from plastic material, perforated with many small holes and the edges of which extend beyond the edges of said vessels and after filling of said vessels with the pieces of flesh, in folding down over the flesh the edges of said sheet so that said sheet wraps said pieces of flesh.

8. A method according to claim 1, wherein after said cooking said vessels are placed within an outer overpacking which is tightly closed after having filled it with an inert gas.

* * * * *

UNITED STATES PATENT AND TRADEMARK OFFICE
CERTIFICATE OF CORRECTION

PATENT NO. : 3,987,209
DATED : October 19, 1976
INVENTOR(S) : JACQUES ANDRE GUSTAVE GATINEAU et al It is certified that error appears in the above–identified patent and that said Letters Patent are hereby corrected as shown below:

Item 73 on the front face of the patent should be changed to correctly indicate the Assignee as --Central Properties Company Limited, Vaduz, Liechtenstein and Jacques Andre Gustave Gatineau, Villers—Cotterets, France, part interest each. --.

Signed and Sealed this

Twenty-sixth Day of April 1977

[SEAL]

Attest:

RUTH C. MASON
Attesting Officer

C. MARSHALL DANN
Commissioner of Patents and Trademarks